3,031,261
URANIUM RECOVERY FROM NUCLEAR FUEL
Richard C. Vogel, Hinsdale, and Walton A. Rodger, Naperville, Ill., assignors to the United States of America as represented by the United States Atomic Energy Commission
Filed Sept. 29, 1959, Ser. No. 843,323
1 Claim. (Cl. 23—14.5)

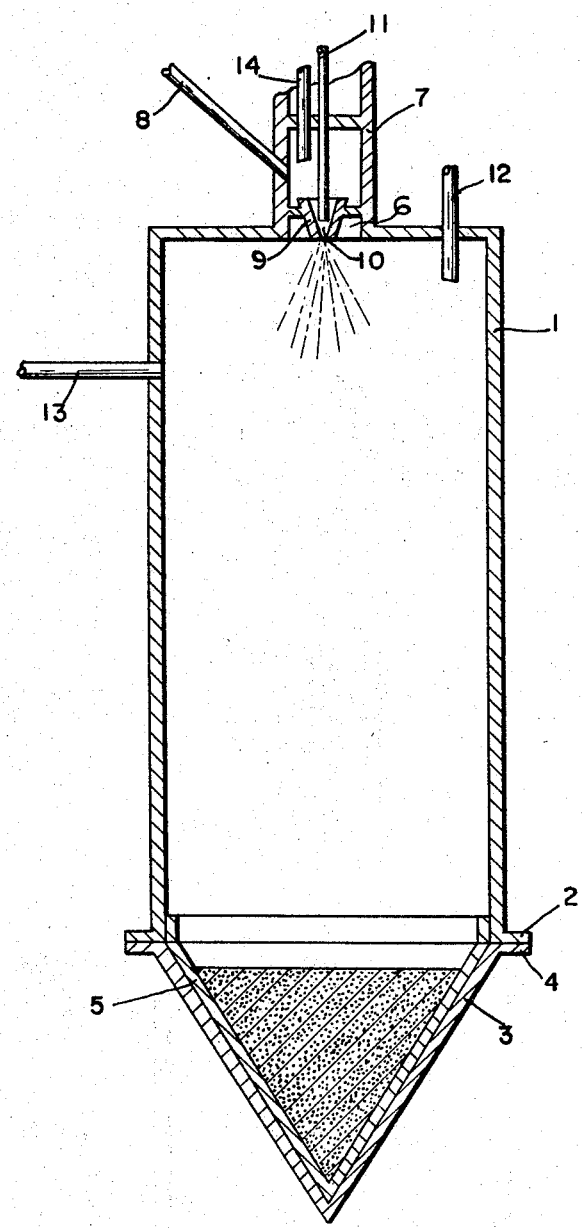

This invention deals with a process of recovering uranium from fuel elements that have been neutron-bombarded in nuclear reactors and in particular with the recovery of uranium from salt mixtures that have been obtained from fuel elements predominantly consisting of a uranium-containing zirconium alloy.

Fuel elements of the type just described may be processed by dissolving them in a fused mixture of sodium fluoride and zirconium fluoride at a temperature of about 600° C., by sparging the melt obtained with hydrogen fluoride whereby zirconium fluoride and uranium tetrafluoride are formed, followed by sparging with fluorine gas whereby the uranium tetrafluoride is converted to the hexafluoride and volatilized as such.

This process has the disadvantage of high corrosiveness, in particular in the fluorination step with fluorine, because the molten salts at the operating temperature attack the container walls.

It is an object of this invention to provide a method for carrying out the fluorination of a uranium-tetrafluoride-containing salt melt with fluorine in such a way that corrosion is reduced to a minimum.

It is another object of this invention to provide a method for the fluorination of a uranium-tetrafluoride-containing salt melt with fluorine which requires a very short reaction time so that corrosion is still furthermore reduced.

It has been found that the fluorination with fluorine can be carried out without much corrosion and in a comparatively short time if the uranium-tetrafluoride-containing salt mixture is sprayed into a reaction chamber and contacted there with fluorine while the walls of the chamber are kept below the solidification temperature of the salt and contact of the molten salt with the walls is minimized or eliminated entirely.

The process of this invention thus comprises heating a salt containing uranium tetrafluoride to above its melting point; subdividing the molten salt mixture into small droplets by forcing it through an orifice with inert gas under pressure; contacting said molten fluoride droplets with fluorine gas at elevated temperature whereby the uranium tetrafluoride is converted to the hexafluoride; and separating the uranium hexafluoride from other fluorides and excess fluorine.

For the fluorination step a tall cylindrical vessel equipped with a spray nozzle is used. Stainless steel is a satisfactory material; however, nickel or Monel are preferred. The walls of the container in which the salt spray is reacted with fluorine are maintained at a temperature below the melting point of the salt, so that contact by molten fluorides in the presence of the fluorine gas is avoided and corrosion is reduced. Also, the spray angle and vessel diameter are so adjusted that little salt, molten or solidified, contacts the sides of the vessel. By the time the salt reaches the bottom of the vessel it is all solidified.

The accompanying drawing shows a longitudinal cross-sectional view of an apparatus that has been used satisfactorily for the fluorination step. The illustration is diagrammatic. The apparatus is merely one example of possible types of equipment suitable for the process of this invention; it is not part of this invention.

Referring to the drawing in detail, the reference numeral 1 designates a spraying chamber provided with a flange 2 at its lower end. A conical bottom 3 is removably attached to flange 2 of the chamber by means of flange 4; the bottom is provided with a removable liner 5. In the top of the spraying chamber there is a large opening 6 which leads to a salt-melting chamber 7. This salt-melting chamber is provided with induction coils or other heating means (not shown). The salt-melting chamber is equipped with a salt inlet pipe 8. A spray nozzle 9 with orifice 10 extends through the bottom of the salt-melting chamber. A retractable nickel stopper rod 11 leads into said nozzle 9 and orifice 10; this rod in its down-position closes the nozzle, while retraction of the pipe opens it. The down-position of the rod 11 is maintained during preliminary melting and heating of the salt to prevent refreezing of the salt in the orifice and clogging. Also, at the top of the spraying chamber there are arranged an inlet pipe 12 for the introduction of the fluorine gas and a gas-outlet pipe 13. Inert gas, e.g. nitrogen, is piped to the nozzle by means of an inlet line 14.

Before operation proper, the salt is heated above its melting point, preferably to about 200 to 250° C. above the melting point; the salt temperature can range up to 800° C. the spraying chamber is then evacuated and filled with fluorine gas from inlet 12; thereafter the nozzle is opened and the salt is forced through the nozzle by introducing to pipe 14 a current of the inert gas under pressure and at elevated temperature, preferably of about 200° C.

The drop size has some effect on the completeness of the fluorination of the uranium tetrafluoride and on the contact time necessary therefor; it was found that a smaller drop size yields a higher fluorination efficiency. This will be shown later in an example. As a rule, an average drop size of about 100 microns or less was found to be satisfactory, and a contact time of from 0.01 to 10 seconds sufficed for a drop size of from 5 to 1000 microns (diameter), respectively. A nozzle orifice, for instance, having a diameter of 0.02 inch yielded a 65°-angle spray when nitrogen was introduced with a pressure of 40 p.s.i.g.; the droplet size then ranged between 150 and 200 microns.

The temperature within the spraying chamber is maintained high enough to maintain the uranium hexafluoride in vapor form so that it is removed from the chamber with the excess fluorine gas. The uranium hexafluoride is recovered from the gas mixture by a cold trap arranged in the off-gas line.

The solidified mixture can be recycled to the salt-melting furnace for further fluorination and increase of the yield. Likewise, the nonreacted fluorine is recycled into the spray chamber for obvious economical reasons.

The following example is given to illustrate the process of this invention.

*Example*

Forty mole-percent of zirconium fluoride and 60 mole-percent of sodium fluoride, both technical grade, were mixed, and 1 weight-percent of uranium tetrafluoride was added thereto. This mixture was used to simulate a reaction mass as it is obtained after processing uranium-containing fuel material with a zirconium fluoride-sodium fluoride mixture followed by hydrogen fluoride treatment. This salt mixture was heated to about 765° C. and sparged with a mixture of hydrogen fluoride, helium and hydrogen. The thus-pretreated salt mixture was sprayed with nitrogen gas in the apparatus shown in the drawing. Several runs were carried out using varying fluorine temperatures and varying particle sizes of the melted and sprayed fluoride mixture. After the experiments the salts were analyzed by X-ray analysis for their remaining uranium content. The results are shown in the table below. All values represent an average of two runs.

| Fluorine Temp. | Drop Diameter, microns | Uranium Removed, percent |
|---|---|---|
| 20° C | 62.13 | 10.8 |
|  | 118.2 | 8.6 |
|  | 157.7 | 7.2 |
|  | 215.2 | 6.2 |
|  | 307.9 | 5.3 |
| 100° C | 62.13 | 21.4 |
|  | 118.2 | 17.7 |
|  | 157.7 | 12.1 |
|  | 215.2 | 8.3 |
|  | 307.9 | 5.3 |
| 200° C | 62.13 | 25.2 |
|  | 118.2 | 11.3 |
|  | 157.7 | 8.2 |
|  | 215.2 | 6.2 |
|  | 307.9 | 2.6 |

The data show that the smallest drop size and the highest fluorine temperature yield the best results.

On the basis of these and other experimental data, it has been calculated that four reaction chambers 5 feet in diameter and 10 feet high connected in series would recover 99 percent of the uranium in the feed. The salt solidified in one chamber would be processed in the following chamber with a new supply of fluorine gas; in other words, the final product of the first chamber is introduced into the salt-melting chamber for the second reaction chamber, and so forth. The average drop size of the molten salt in all four passes is approximately 100 microns. In each pass about 67% of the uranium are removed as the hexafluoride, so that after the four passes a little more than 1% of the uranium remains in the salt as uranium tetrafluoride.

It will be understood that this invention is not to be limited to the details given herein but that it may be modified within the scope of the appended claim.

What is claimed is:

A process of recovering uranium values from a salt mixture of uranium tetrafluoride, sodium fluoride and zirconium fluoride, comprising heating the salt mixture to above its melting point; spraying the molten salt mixture into droplets of a maximum size of 100 microns by means of nitrogen of about 200° C. and superatmospheric pressure; contacting the molten salt droplets with fluorine gas of about 200° C. for from 0.01 to 10 seconds, while maintaining the walls confining the reaction mixture at a temperature below the melting point of the salt, whereby the uranium tetrafluoride is converted to uranium hexafluoride vapor and volatilized as such and the uranium-free salt solidifies.

References Cited in the file of this patent
UNITED STATES PATENTS

| 2,474,021 | Vining | June 21, 1949 |
| 2,863,735 | Brater et al. | Dec. 9, 1958 |
| 2,893,936 | Hatch et al. | July 7, 1959 |

OTHER REFERENCES

Cathers: AEC Document TID 7534, Book 2, pages 560–573, "Symposium on the Reprocessing of Irradiated Fuels," held at Brussels, Belgium, May 20–25, 1957.

AEC Document ANL–6029, "Summary Report" for April, May, June 1959, pages 101–106.

AEC Document ANL–5996, "Summary Report" for January, February, March 1959, pp. 132, 161–164, 166–169.